United States Patent
Gabel et al.

(12)
(10) Patent No.: US 6,318,116 B1
(45) Date of Patent: Nov. 20, 2001

(54) PLASTIC INTERNAL ACCUMULATOR-DEHYDRATOR BAFFLE

(75) Inventors: Timothy M. Gabel, Tonawanda; Ronald A. Lemmon; Micheal R. Lippa, Jr., both of Amherst; Brian J. Coyle, Orchard Park, all of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/668,802

(22) Filed: Sep. 22, 2000

(51) Int. Cl.[7] .............................. F25B 43/04; F25B 43/00
(52) U.S. Cl. .................................... 62/475; 62/503
(58) Field of Search ............................ 62/475, 503, 509, 62/498, 474, 512, 85; 210/282, 285, DIG. 6

(56) References Cited

U.S. PATENT DOCUMENTS 4,496,378 * 1/1985 Kish ................................... 62/530 X
5,493,875 * 2/1996 Kozinski ................................ 62/503

FOREIGN PATENT DOCUMENTS

01318866A * 12/1989 (JP) .

* cited by examiner

*Primary Examiner*—Henry Bennett
*Assistant Examiner*—Chen-Wen Jiang
(74) *Attorney, Agent, or Firm*—Patrick M. Griffin

(57) ABSTRACT

A baffle for use in an accumulator-dehydrator used in an air conditioning system having at least a first and a second evaporator and a compressor interconnected by refrigerant lines containing refrigerant. The accumulator-dehydrator first and second inlets all connected to the evaporators and an outlet is connected to the compressor through the refrigerant lines. The baffle is mounted inside the accumulator-dehydrator at either the first or second inlet. The baffle has a housing with an opening to allow liquid refrigerant and oil discharged from one of the evaporators to enter the accumulator-dehydrator and prevent liquid refrigerant and oil from within the accumulator-dehydrator from re-entering the inlet.

15 Claims, 3 Drawing Sheets

PLASTIC INTERNAL ACCUMULATOR-DEHYDRATOR BAFFLE

TECHNICAL FIELD

This invention relates to an accumulator-dehydrator for use in air conditioning systems and more specifically relates to an accumulator-dehydrator with an internal plastic baffle for prevention of oil accumulation in the rear air conditioning lines of a vehicle.

BACKGROUND OF THE INVENTION

Vehicle air conditioning systems include a compressor that compresses and superheats refrigerant, which then runs through a condenser, an expander and evaporator in turn before returning to the compressor to begin the cycle again. Mixed in with the refrigerant is a small amount of lubricating oil, which is entrained within the refrigerant and is needed to ensure the smooth performance of the compressor and to prolong the life of the compressor. Compressor life is directly related to the correct amount of oil reaching the compressor.

Interposed between the evaporator and compressor is an accumulator-dehydrator which is designed to accomplish several objectives. The accumulator-dehydrator primarily receives and accumulates the evaporator output. The evaporator output typically includes both a liquid component and a vapor component. The accumulator-dehydrator serves as a separator in which fluid collects at the bottom of the reservoir and vapor at the top. The accumulator-dehydrator ensures that only refrigerant in a vapor stage and entrained oil passes to the compressor. The accumulator-dehydrator prevents a liquid slug of refrigerant from being pulled or sucked into the compressor. Still further, a desiccant is typically located in the bottom of the accumulator-dehydrator to absorb any water in the refrigerant.

Traditionally accumulator-dehydrators are known to use a U-Shaped or J-Shaped tube more commonly known as a J-tube to direct vaporized refrigerant and draw in oil. The accumulator-dehydrator includes a canister with an inlet connected to the evaporator. The refrigerant enters the inlet as a vapor and liquid mixture. The liquid drops to the bottom of the canister and the vapor rises to the top. The J-tube is connected at one end to the canister outlet, which in turn is connected to the compressor. The J-tube extends down from the outlet to near the bottom of the canister and then turns upward and extends to near the top of the canister. The free end of J-tube, the portion near the canister top, is open to allow the vapor to be drawn into the J-tube and exit to the inlet of the compressor. A small opening is provided in the bottom turn-portion or U-portion of the J-tube to allow the liquid including the oil, to enter the J-tube and be entrained and delivered with the vapor to the compressor.

Traditionally, the rear system air conditioning lines were routed down stream of the accumulator-dehydrator into the compressor suction line. This design has the potential to send the rear air conditioning system liquid refrigerant directly to the compressor. If liquid refrigerant did reach the compressor it could cause failure. Because of this potential refrigerant "slugging", the rear air conditioning lines were routed into the accumulator-dehydrator to take advantage of the accumulator-dehydrator liquid separation capability. By changing the routing of the rear lines; however, a problem of oil accumulation in the rear air conditioning line developed when the front air conditioning system was on and the rear air conditioning system was off. The pressure and flow from the front line caused the oil in the accumulator-dehydrator to foam or splash and enter the rear lines and become trapped in the rear line. This collection of oil in the air conditioning line caused the percentage of oil available to the compressor to decrease. This had a negative effect on compressor durability. Sometimes this was corrected by placing an extra upward bend in the line approaching the accumulator-dehydrator. However, because of underhood space constraints and routing constraints this was difficult to package in most vehicles.

SUMMARY OF THE INVENTION

The present invention eliminates the problem of stripping oil from the system when rear HVAC is off while maintaining a compact air conditioning system. The present invention has a baffle internal to the accumulator-dehydrator located at the inlet connection of the accumulator-dehydrator for the rear HVAC module. The internal baffle allows the rear air conditioning line to be routed directly to the accumulator-dehydrator while at the same time preventing oil accumulation in the rear air conditioning line.

The accumulator-dehydrator of the present invention contains an interior baffle affixed to the inlet port on the inside of the canister of the accumulator-dehydrator. One baffle has a hollow tube with a partially closed housing at its end. In the preferred embodiment, the housing has four sides with two of the sides being open to allow fluid to enter the accumulator-dehydrator while restricting any return of fluid into the rear line. These open sides arc generally parallel to the longitudinal centerline of the accumulator-dehydrator.

The housing of the preferred embodiment has two flat plates. One end of the tube is attached to the first plate, which has an opening the same size or smaller than the diameter of the tube. The second plate of the baffle is attached to the first plate at a predetermined distance away from first plate. Opposed sidewalls connect these plates. Additionally, a support rib is provided between the plates. This support rib not only strengthens the baffle, but also assists in restricting back flow of fluid since it is mounted adjacent the tube opening and is generally parallel to the open sides of the housing. The end of the tube opposite the plates is attached to the inlet fitting of the canister.

This invention eliminates the collection of oil in the air conditioning line and ensures that an adequate amount of oil is available and is continuously being sent to the compressor. The baffle prevents the oil from escaping the accumulator-dehydrator through the inlet line and collecting in the air conditioning line preventing an "oil trap" from occurring.

BRIEF DESCRIPTION OF THE DRAWINGS

Other advantages of the present invention will be readily appreciated, as the same become better understood by reference to the following detailed description when considered in connection with the accompanying drawings wherein.

DESCRIPTION OF THE PREFERRED EMBODIMENT

Figure 1:
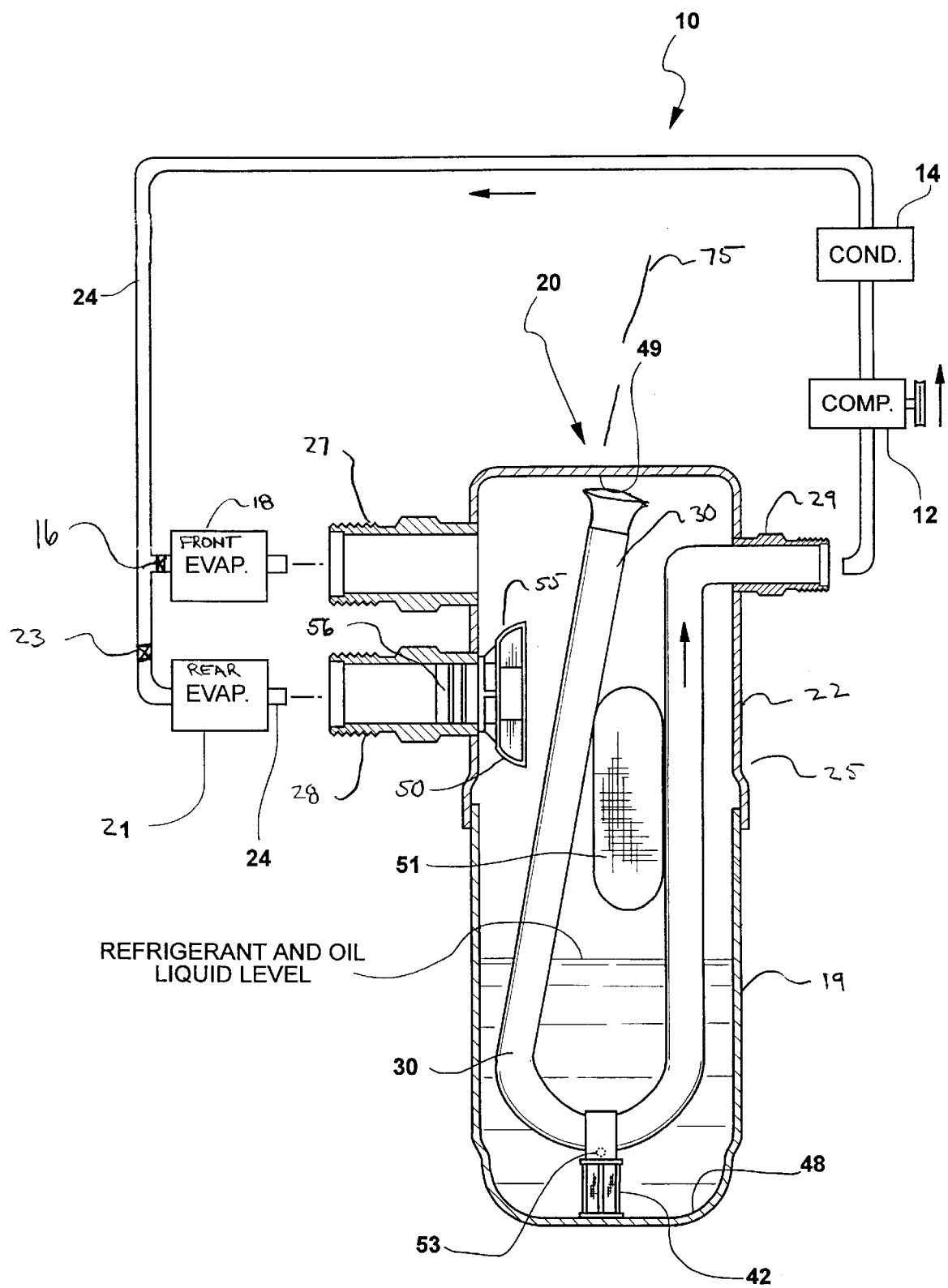
FIG. 1 is a schematic side view of the baffle of the present invention in an accumulator-dehydrator.
Figure 2:
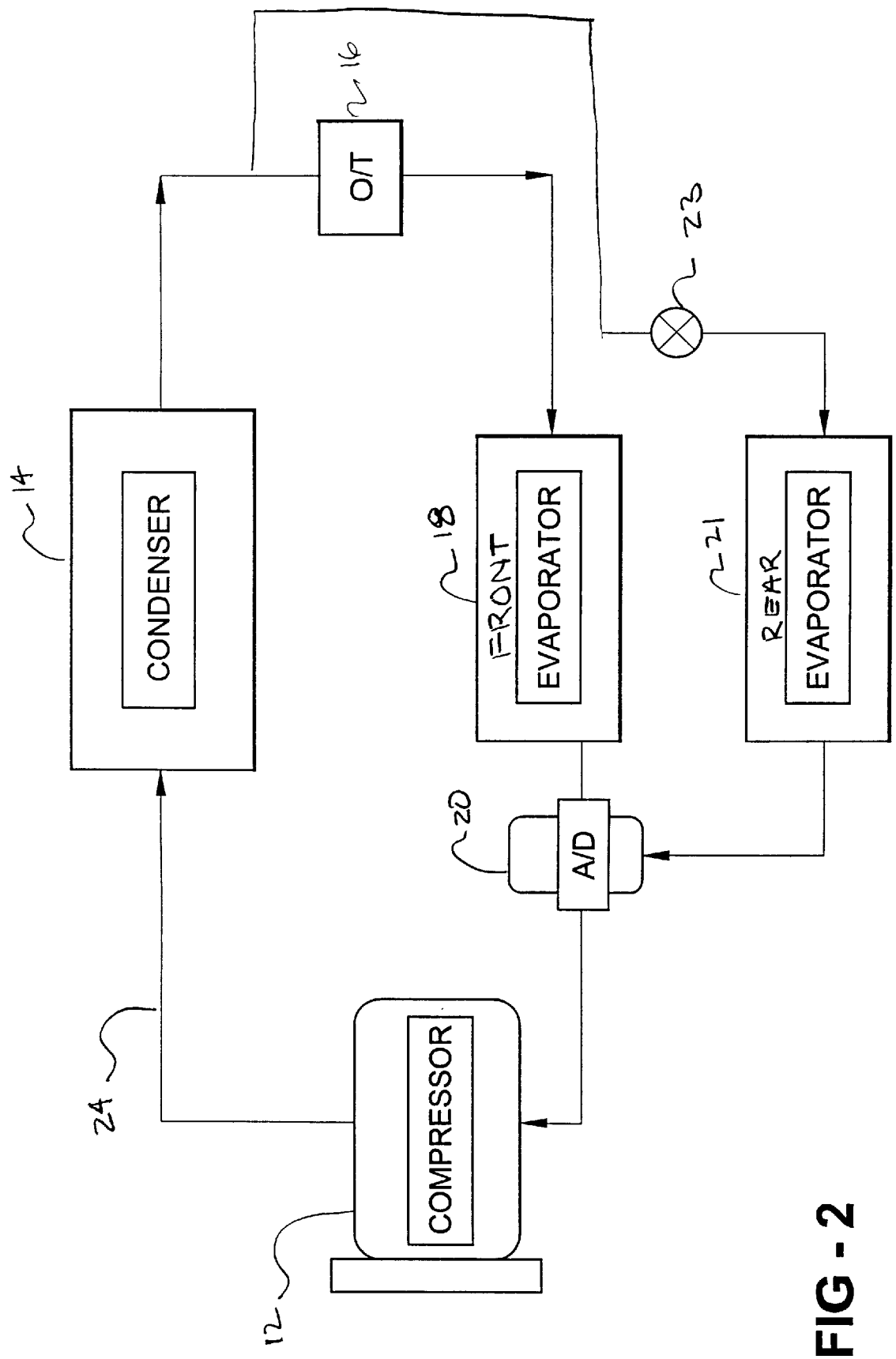
FIG. 2 is a schematic of an air conditioning circuit having front and rear systems.

Referring to FIGS. 1 and 2, there is generally shown at 10 a main vehicle air conditioning system which includes a compressor 12 that compresses and superheats refrigerant, after which the super heated refrigerant passes through a condenser 14 where a heat transfer takes place as the superheated refrigerant begins to turn from a superheated vapor to a cooler gaseous phase, then on to an orifice expansion device 16 wherein the pressure is reduced and then to the front HVAC evaporator 18 and to a separate expansion device if the rear system is on to evaporator 21 wherein a heat transfer again takes place to cool the surrounding environment before returning to compressor 12 to begin the cycle again. Mixed in with the refrigerant is a small amount of lubricating oil entrained within the refrigerant which is needed to ensure smooth performance of compressor 12 and to prolong the life of compressor 12. A valve 23 controls the flow of refrigerant to the rear evaporator 21, see FIG. 2.

The accumulator-dehydrator 20 primarily receives and accumulates the output of evaporators 18 and 21. The output of evaporators 18 and 21 typically includes both a liquid component and a vapor component. The accumulator-dehydrator 20 serves as a reservoir or separator in which fluid collects at the bottom 48 of the reservoir and vapor at the top 49. Accumulator-dehydrator 20 ensures that refrigerant in a vapor stage passes to compressor 12 with entrained oil. The accumulator-dehydrator 20 also prevents a liquid slug from being pulled or sucked into compressor 12.

In the disclosed embodiment of accumulator-dehydrator 20, a two piece casing is used having cup-shaped members 19, 22. These two cup-shaped members 19, 22 form a canister 25. A pair of inlet fittings 27 and 28 for receipt of the front and rear lines 24 of the air conditioning system 10 and an outlet fitting 29 are formed in the canister 25. In the disclosed embodiment, a J-tube 30 is illustrated connected to the outlet fitting 29. In use, refrigerant containing oil enters accumulator-dehydrator 20 through inlets 27 and 28 if both evaporators 18 and 21 are being used, or through inlet 27 if the rear evaporator 21 is not in use. The vaporized refrigerant rises to the top 49 of canister 25 and liquid refrigerant and oil drops to the bottom 48 of canister 25. In this way, compressor 12 draws vaporized refrigerant into J-tube 30 from the top 49 of canister 25 and oil from the bottom 48.

The bottom of the J-tube 30 has a small opening 53 to draw in oil. As will be appreciated by those of ordinary skill in the art, oil is required to be entrained with the vaporized refrigerant to lubricate compressor 12. A filter screen 42 is provided to filter the oil as it is drawn into J-tube 30. A desiccant 51 is mounted inside canister 25 for removing any water or moisture from the refrigerant.

Figure 3:
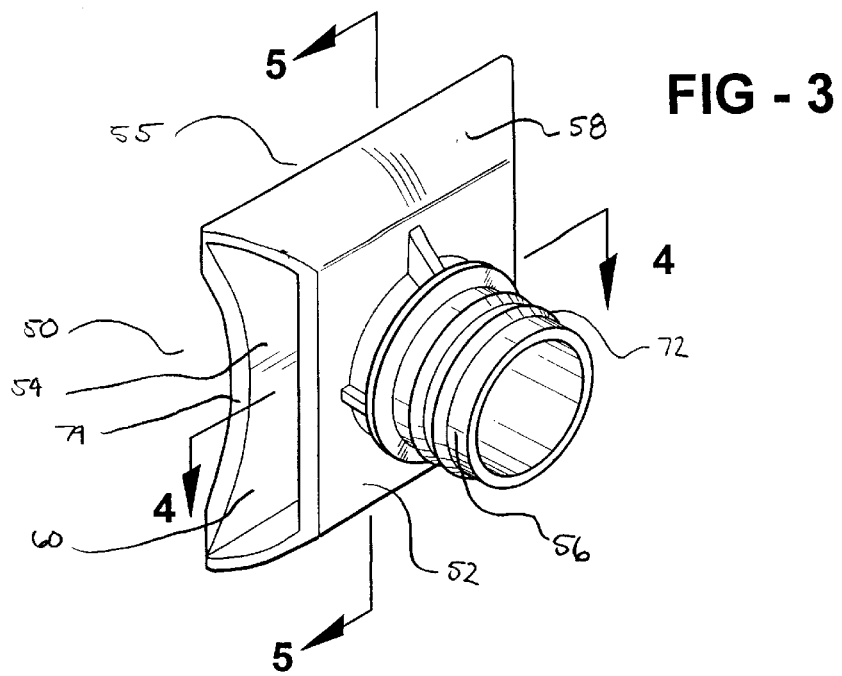
FIG. 3 is a perspective view of the baffle of the present invention.
Figure 4:
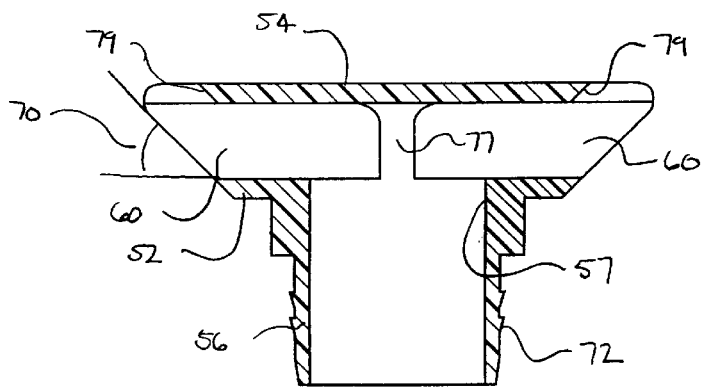
FIG. 4 is a cross-sectional view of the baffle of the present invention taken along the line 4—4 of FIG. 3.
Figure 5:
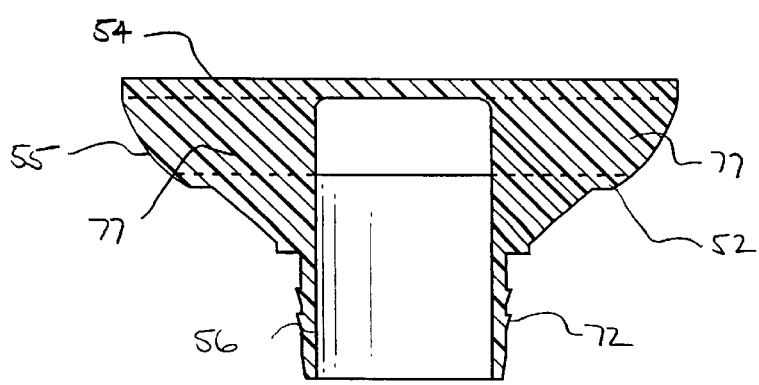
FIG. 5 is a cross-sectional view of the baffle taken along the line 5—5 of FIG. 3.

With reference to FIG. 1, a baffle 50 is located at the inlet fitting 28 inside canister 25. The baffle 50 has an inlet tube 56 with a partially closed housing shown generally at 55 at its end inside the canister 25. Referring to FIGS. 3, 4 and 5, the housing 55 includes a first plate 52 with an opening 57, which communicates with tube 56. A second plate 54 is spaced from the first plate 52 and attached to plate 52 by sidewalls 58. As illustrated in FIGS. 3, 4 and 5, the housing 55 has open sides 60 to allow refrigerant and oil to enter the canister 25.

In use the refrigerant and oil is pumped from the rear evaporator 21 into the inlet 28 against the plate 54 and out through open sides 60 into the accumulator-dehydrator 20. Simultaneously, the evaporator 18 pumps refrigerant and oil through inlet 27. In the event that valve 23 is closed, flow will stop from evaporator 21, but continues from evaporator 18. The contents of the accumulator-dehydrator can raise and foam within canister 25. Baffle 50 prevents the oil from flowing back into line 24. The open sides 60 are preferably positioned parallel to the longitudinal centerline 75 of the canister 25. Further, in the preferred embodiment, support ribs 77 are provided between plates 52 and 54 to provide support to the baffle 50, and to further restrict the ingress of oil into the baffle 50. Preferably, the ribs 77 are generally parallel to the longitudinal centerline 75. Still further in the disclosed embodiment, the plate 54 has curved edges 79 adjacent openings 60. These curved edges 79 direct the incoming fluid more uniformly into canister 25.

In the preferred embodiment, the baffle is made of plastic with plate 52 being about 34.6 mm by 30 mm and plates 54 being about 43.4 mm by 46 mm. The plates 52 and 54 are about 1.5 mm thick. The distance between plates 52 and 54 is about 10.1 mm. The angle 70 is about 45°. The tube 56 has a diameter of about 18.42 mm with ridges 72 that have a diameter of about 18.92 mm.

The invention has been described in an illustrative manner, and it is to be understood that the terminology, which has been used, is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An accumulator-dehydrator for use in an air conditioning system having at least a first and a second evaporator and a compressor interconnected by refrigerant lines containing refrigerant, said accumulator-dehydrator comprising:

a canister having an upper portion and a lower portion, said lower portion being adapted to contain liquid refrigerant and oil from said refrigerant lines and said upper portion being adapted to contain vaporized refrigerant, said canister having first and second inlets adapted to be connected to said evaporators through said refrigerant lines and an outlet adapted to be connected to said compressor through said refrigerant lines;

a delivery tube having first and second open ends, said first end being unobstructed and positioned within the upper portion of said canister to draw in vaporized refrigerant, said second end being connected to said outlet to deliver vaporized refrigerant and entrained oil to said compressor and an oil pickup for drawing in liquid oil from said lower portion for delivery to said outlet, said oil pickup being in operative communication with said delivery tube;

a baffle mounted inside said canister at said first inlet, said baffle having a housing with an opening to allow liquid refrigerant and oil discharged from one of said evaporators to enter said canister, said housing preventing liquid refrigerant and oil from within said canister from re-entering said first inlet.

2. The accumulator-dehydrator of claim 1, wherein said baffle includes an inlet tube and said housing includes a first plate extending from said inlet tube and a second plate spaced from said first plate and connected to said first plate through a pair of side walls, said opening being defined by said first and second plates.

3. The accumulator-dehydrator of claim 2, wherein said canister has a longitudinal centerline and said pair of side walls are generally perpendicular to the said longitudinal centerline.

4. The accumulator-dehydrator of claim 2, further including at least one support lib extending between said first and second plates.

5. The accumulator-dehydrator of claim 4, wherein said canister has a longitudinal centerline and said pair of side walls are generally perpendicular to the said longitudinal centerline and said at least one support rib is generally parallel to said longitudinal centerline.

6. The accumulator-dehydrator of claim 2, wherein said side walls are angled at about 45 degrees with respect to said first plate.

7. The accumulator-dehydrator of claim 2, wherein said first and second plates have cross sectional areas with the cross sectional area of said first plate being less than the cross sectional area of said second plate.

8. The accumulator-dehydrator of claim 2, wherein said second plate has opposed edges with two of said edges being, curved inwardly.

9. A baffle for use in an accumulator-dehydrator used in an air conditioning system having at least a first and a second evaporator and a compressor interconnected by refrigerant lines containing a refrigerant, said accumulator-dehydrator having first and second inlets connected to said evaporators through said refrigerant lines and an outlet connected to said compressor through said refrigerant lines, said baffle comprising:

an inlet tube adapted to be connected to said first inlet and a housing with an opening to allow liquid refrigerant and oil discharged from one of said evaporators to enter said accumulator-dehydrator, said housing preventing liquid refrigerant and oil from within said accumulator-dehydrator from re-entering said first inlet.

10. The baffle of claim 9, further including a first plate extending from said inlet tube and a second plate spaced from said first plate and connected to said first plate through a pair of side walls, said opening being defined by said first and second plates.

11. The baffle of claim 10, wherein said accumulator-dehydrator has a longitudinal centerline and said pair of side walls are generally perpendicular to the said longitudinal centerline.

12. The baffle of claim 10, further including at least one support rib extending between said first and second plates.

13. The baffle of claim 4, wherein said accumulator has a longitudinal centerline and said pair of side walls are generally perpendicular to the said longitudinal centerline and said at least one support rib is generally parallel to said longitudinal centerline.

14. The baffle of claim 10, wherein said side walls are angled at about 45 degrees with respect to said first plate.

15. The baffle of claim 10, wherein said first and second plates have cross sectional areas with the cross sectional area of said first plate being less than the cross sectional area of said second plate.

* * * * *